Dec. 13, 1955     E. L. FLOOD     2,726,688
SAW LUBRICATING DEVICE
Filed March 15, 1954
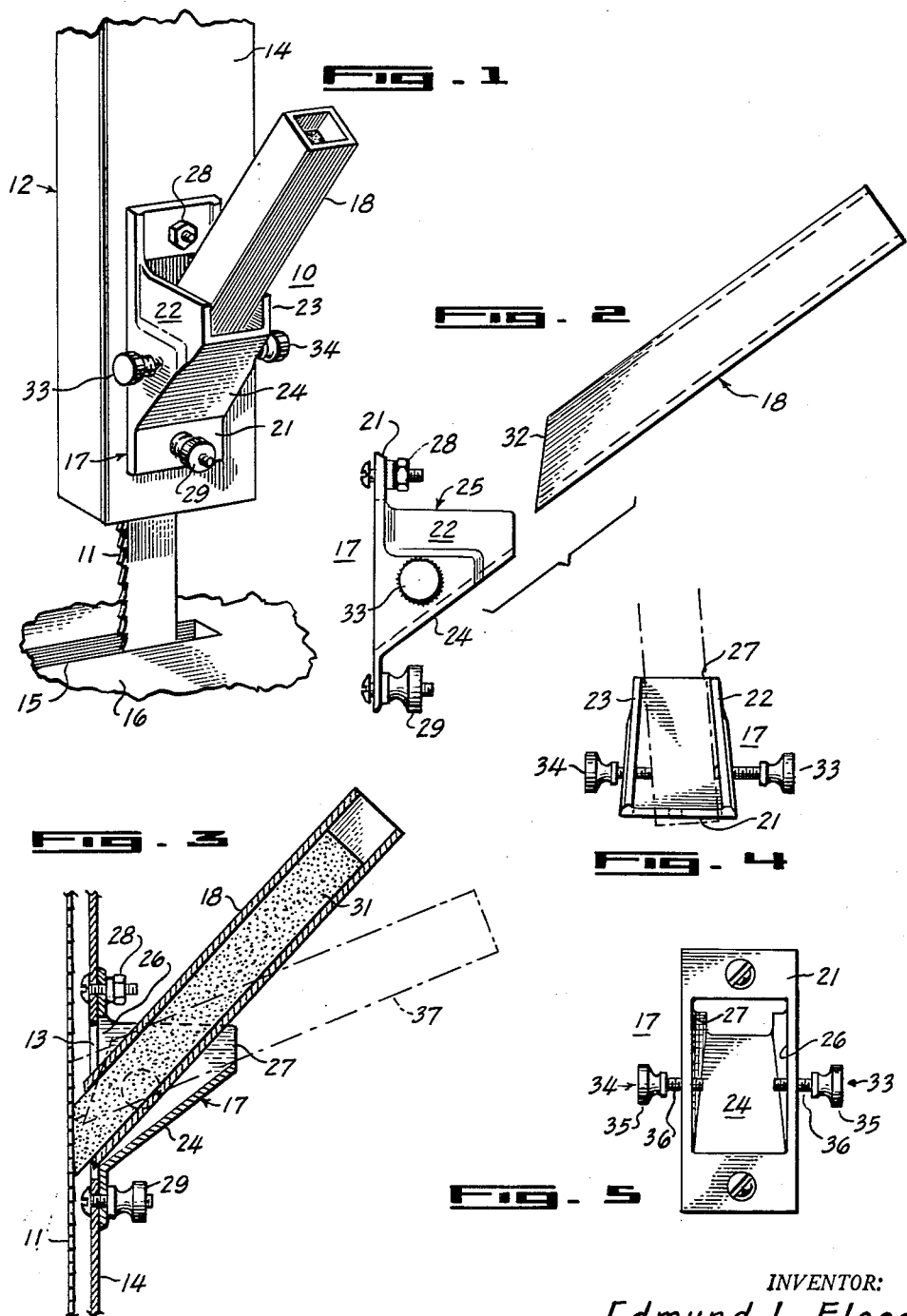
INVENTOR:
*Edmund L. Flood*
BY
*Walter J. Jason*
ATTORNEY

United States Patent Office

2,726,688
Patented Dec. 13, 1955

2,726,688

SAW LUBRICATING DEVICE

Edmund L. Flood, San Diego, Calif., assignor, by mesne assignments, to General Dynamics Corporation, a corporation of Delaware Application March 15, 1954, Serial No. 416,092

5 Claims. (Cl. 143—158)

This invention relates to lubricating devices and more specifically to a lubricant device of improved form for applying solid-type lubricants automatically and continuously to a power-driven saw blade.

An object of the present invention is to provide a lubricating device of improved form which will effectively apply lubricant to a saw blade while such saw blade is in operation.

Another object of this invention is to provide a lubricating device for applying solid-type stick lubricant to a driven saw blade embodying an improved construction permitting ready adjustment of the lubricant relative to the saw blade to control contact of the lubricant with the saw blade.

Another object of this invention resides in providing an improved lubricating device which is inexpensive to manufacture and efficient and economical in use.

Other objects and features of the present invention will be readily apparent to those skilled in the art from the following specification and appended drawings illustrating certain preferred embodiments in which:

Figure 1 is a perspective view of the lubricant device in accordance with the present invention and mounted in operative position relative to a saw blade.

Figure 2 is a side elevational view of the present lubricant device with certain parts in disassembled relation.

Figure 3 is a vertical sectional view of the present invention showing the angular relationship to the saw blade of the lubricant and of the guide member which contains the lubricant.

Figure 4 is a top view of the mounting member of the present lubricant device and with the upper mounting bolt assembly removed for clarity; and Figure 5 is a rear view of the mounting member of Figure 4.

Referring now with particularity to the drawings a lubricant device constructed in accordance with the present invention is therein indicated generally by the numeral 10. Lubricant device 10, in Figure 1, is illustrated in operative position relative to a conventional band saw blade 11. Associated with saw blade 11 is the usual elongated saw guard 12 which suitably is substantially U-shaped in cross-section. Saw guard 12 is provided with an opening 13 in its vertical wall 14 over which opening lubricant device 10 is adapted to be mounted, and through which opening access is afforded for passing lubricant to the saw blade 11. Saw blade 11 travels in conventional manner vertically downward through the saw guard 12 and through a slot 15 in the usual work table 16. Conventional alignment means (not shown) for maintaining accuracy of movement of the saw blade 11 and usual power means (not shown) for driving the saw blade 11 are associated in normal manner with saw blade 11. The details and particular construction of the machine of which saw blade 11 is an element form no part of the present invention and, therefore, it becomes unnecessary to provide a detailed description of such machine.

Lubricant device 10 embodies a mounting member 17 and an open ended hollow container or guide member 18. Mounting member 17 comprises a mounting wall portion 21 from which forwardly project a pair of generally triangular laterally spaced wall portions 22 and 23. Wall portions 22 and 23 are joined at their bottom edges by a base wall portion 24 which is inclined outwardly and upwardly relative to mounting wall portion 21 and which is integral therewith and with triangular wall portions 22 and 23. Triangular wall portions 22 and 23 cooperate with inclined base wall portion 24 to form in effect an inclined chute which as a whole is indicated generally by the numeral 25. Chute 25 is provided with a rear opening 26 through mounting wall portion 21 and a forward opening 27. As shown, there is a slight convergence of triangular wall portions 22 and 23 toward one another so that forward opening 27 to the chute is of smaller lateral dimension than is rear opening 26 in its lateral dimension. Chute 25, thus, gradually widens from its entrance to its exit. Rear or exit opening 26 is adapted to be disposed in communication with the opening 13 in saw guard 12 on attachment of mounting member 17 to saw guard 12. Opening 13 affords passage for the end of a lubricant stick into the interior of saw guard 12 and this opening is of sufficient dimension to provide space for lateral adjustment of the end of such stick to assure registry of the stick with the teeth of the saw blade being lubricated and further its height is sufficiently large to permit vertical adjustment of the end of a lubricant stick in order to change the angle of inclination of the lubricant stick relative to the saw blade, as will be hereinafter further considered.

Mounting member 17 is adapted to be attached at one end to wall 14 of saw guard 12 by a nut and bolt assembly 28 which, when tightened, secures the upper end of mounting wall portion 21 in place. To secure mounting member 17 at its opposite end, there is provided a second nut and bolt assembly 29 which is located at the lower end of mounting wall portion 21 below the bottom edge of inclined wall portion 24.

Container or guide member 18, through which a solid form saw lubricant stick 31 may be fed, is received by mounting member 17 within its chute portion 25, and is supported therewithin at an acute angle to mounting wall portion 21. Forward opening 27 of chute 25 is of sufficient lateral dimension to readily accommodate the width of container or guide member 18 with but restricted lateral movement permitted, while opening 26 is relatively larger to permit the lateral adjustment of the lower end of guide member 18 necessary to properly register the stick 31 with the teeth of saw blade 11 as will be further hereinafter discussed. Guide member 18 is shown as being of elongated box-like configuration having its lower end inwardly inclined, as at 32, to the longitudinal axis thereof. Saw lubricant stick 31 conforms in shape to the guide member 18 which receives it and is of cross-sectional dimension to permit it to slide freely downwardly within such inclined member 18 to project through open end 32 thereof and through aligned openings 26 of mounting member 17 and 13 of saw guard 12 to gear against saw blade 11. The weight of the saw lubricant stick will hold it in contact with saw blade 11. It is apparent that by reason of the inclination of wall portion 24, of chute 25, which has at an acute angle to mounting wall portion 21 and saw blade 11, that the saw lubricant stick 31 will be presented to saw blade 11 at an acute angle thereto.

To maintain guide member 18 within chute 25 there are provided a pair of thumb screws 33 and 34 which are adjustably mounted, in opposition, on triangular side walls 22 and 23 of chute 25. Screws 33 and 34 are each provided with a head 35 appropriately knurled for ready actuation of the screws and with a shank 36 adapted to project into the interior of the chute 25. The interior ends of shanks 36 for screws 33 and 34 are adapted to engage opposite sides of box-like guide member 17 adjacent the inclined end 32 thereof and to be tightened thereagainst to secure the lower end of guide member 18.

An adjustable feature is afforded the present invention by the provision of the thumb screws 33 and 34. It is apparent, particularly from viewing Figures 4 and 5, that by proper manipulation of the screws 33 and 34 the end of guide member 18 can be variously positioned along the lateral dimension of rear opening 26 to vary the point at which the end of lubricant stick 31 passes through opening 13 in saw guard 12 which aligns with opening 26. The purpose of this adjustable positioning is to obtain accurate registration of the lower end of saw lubricant stick 31 with the teeth of saw blade 11. If when lubricating device 10 is mounted upon saw guard 12 it is found that the saw lubricant stick 31 does not contact the teeth or working edge of the saw blade 11 it is a simple matter to selectively adjust the thumb screws 33 and 34 to shift the end of guide member 18 so that saw lubricant stick 31 will project therefrom in proper alignment with the working edge of saw blade 11. It is understood that the efficiency with which saw blade 11 performs is dependent on its working edge being lubricated; the fact that the rear portion of the saw blade 11 may not be lubricated should the saw blade be wider than the lubricant stick is not of importance since the efficiency of the cutting operation will not be impaired.

It is also apparent that saw blades of differing widths may be accommodated by the present invention since the guide member 18 can be readily shifted by means of thumb screws 33 and 34 should a smaller blade be substituted for a larger, or vice versa, to carry the end of the saw lubricant stick 31 to the working edge of such substituted blade.

It is noted that for the purpose of varying the amount of lubricant applied to a saw blade the present construction permits vertical shifting of the lower end 32 of guide member 18 within aligned openings 26 and 13 to change the inclination of guide member 18 and its lubricant stick 31 relative to saw blade 11, as is apparent from Figure 3. Figure 3 illustrates two adjusted inclined positions that may be assumed by end 32 of guide member 18; in its full line representation the guide member 18 occupies an inclined position wherein a greater area of the projected end of the saw lubricant stick 31 rubs or bears upon the working edge of saw blade 11 than the area which bears against such working edge when guide member 18 occupies the inclined position shown in dash-dot outline and indicated generally by the numeral 37. In permitting variation of the area of lubricant stick presented to the working edge of saw blade 11 the present device assures economical use of the lubricant. It has been found that in cutting thin workpieces or workpieces of soft material that less lubricant is required to be applied to the working edge of the saw blade than in the cutting of thicker workpieces or workpieces made of hard material. Therefore, if workpieces of the latter nature are encountered the guide member 18 will be adjusted to an inclined position, such as its full-line position in Figure 3, wherein the saw blade 11 will be offered a wide area of lubricant to move across; if a thin or soft workpiece is being cut the guide member 18 will be moved to a position, such as dash-dot position 37, wherein the inclination of the lubricant to the saw blade is less and, therefore, less area of lubricant is presented. It is but a matter of experience to determine the inclined positions which will provide sufficient lubricant and without waste. The thumb screws 33 and 34 serve to maintain the end of guide member 18 in the desired vertically adjusted position within openings 26 and 13. After the end of guide member 18 has been manually located in the vertical position which will afford the desired angle of inclination to guide member 18 and its lubricant stick 31 the ends of the screws 33 and 34 are tightened upon the sides of guide member 18 to secure it in such location.

Thus, thumb screws 33 and 34 are utilized not only to effect lateral adjustment of the end of guide member 18 but also to maintain both lateral and vertical adjustments thereto to fix both the lateral position of the end of lubricant stick 31 relative to saw blade 11 and the inclination of such stick thereto. They effectively serve to establish the direction of travel of the lubricant stick so that it will be applied most efficiently to the saw blade.

While certain preferred embodiments of the invention have been specifically disclosed, it is understood that the invention is not limited thereto as many variations will be readily apparent to those skilled in the art and the invention is to be given its broadest possible interpretation within the terms of the following claims:

What I claim is:

1. A saw blade lubricating device comprising a mounting member having a wall portion with an orifice therein and a plurality of outwardly projecting wall portions juxtaposed to said orifice, one of said projecting wall portions being inclined at an acute angle to said first mentioned wall portion, a guide member positioned on said mounting member within the space defined by said projecting wall portions and adapted to support a stick of solid lubricant for guided movement through said orifice, and adjustable means carried by certain of said projecting wall portions for varying the position of said guide member relative to said mounting member to change the direction of travel of said stick of solid lubricant.

2. A saw blade lubricating device comprising a mounting member having an exit orifice therein and a chute-like portion juxtaposed to said orifice, said chute-like portion including a wall inclined at an acute angle to the plane of said exit orifice, a guide member positioned within said chute-like portion and adapted to support a stick of solid lubricant for guided movement through said orifice, and adjustable means carried by said chute-like portion for varying the position of the guide member, both laterally and vertically, within said chute-like portion to change the direction of travel of said stick of solid lubricant.

3. A saw blade lubricating device comprising a mounting member having an exit orifice therein and a chute-like portion juxtaposed to said orifice, said chute-like portion including a pair of laterally spaced walls and an interconnecting wall therebetween, said latter wall being inclined at an acute angle to the plane of said exit orifice, a laterally and vertically adjustable guide member positioned within said chute-like portion and adapted to support a stick of solid lubricant for guided movement through said orifice, and oppositely disposed adjustable screw means carried by said laterally spaced walls of said chute-like portion for varying the lateral position of the guide member and for maintaining the position of the guide member, both laterally and vertically, within said chute-like portion to establish the direction of travel of said stick of solid lubricant.

4. A saw blade lubricating device comprising a mounting member, means for securing said mounting member adjacent a saw blade, said mounting member having an exit orifice therein and a chute-like portion juxtaposed to said orifice, said chute-like portion including a wall inclined at an acute angle to the plane of said exit orifice, an elongated laterally and vertically adjustable guide member positioned within said chute-like portion and adapted to support a stick of solid lubricant for guided movement through said orifice, and to hold said lubricant against said saw blade at an acute angle thereto, and adjustable means carried by said chute-like portion for varying the lateral position of the guide member and for maintaining the position of the guide member, both laterally and vertically, within said chute-like portion to establish the angular position and the lateral position of said lubricant stick means relative to the saw blade.

5. A saw blade lubricating device comprising a mounting member, means for securing said mounting member adjacent a saw blade, said mounting member having a mounting wall portion with an exit orifice therein and a chute-like portion juxtaposed to said orifice, said chute-like portion including a pair of laterally spaced walls and an interconnecting wall therebetween, said latter wall being inclined at an acute angle to said mounting wall portion, an elongated laterally and vertically adjustable guide member adjustably positioned within said chute-like portion and adapted to support a stick of solid lubricant for guided movement through said orifice and to hold said lubricant against said saw blade at an acute angle thereto, and oppositely disposed adjustable screw means carried by said laterally spaced walls of said chute-like portion for varying the lateral position of the guide member and for maintaining the position of the guide member, both laterally and vertically, within said chute-like portion to establish the angular disposition and the lateral disposition of said lubricant stick relative to the saw blade.

References Cited in the file of this patent

UNITED STATES PATENTS

| | | |
|---|---|---|
| 319,624 | Rodebaugh | June 9, 1885 |
| 2,529,249 | Flood | Nov. 7, 1950 |